(12) United States Patent
Douillard et al.

(10) Patent No.: US 6,354,211 B1
(45) Date of Patent: Mar. 12, 2002

(54) METHOD AND APPARATUS FOR ABSORBING LATERAL SIDEFRAME VIBRATION IN PRINTING UNITS

(75) Inventors: Gerald Roger Douillard, Dover; Eric Michael Lapine, Northwood; James Richard Belanger, Portsmouth, all of NH (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/461,863

(22) Filed: Dec. 15, 1999

(51) Int. Cl.$^7$ ................................................. B41F 13/00
(52) U.S. Cl. ........................................ 101/480; 101/494
(58) Field of Search ............................... 101/480, 494; 400/337, 338.2, 322

(56) References Cited

U.S. PATENT DOCUMENTS 4,921,365 A * 5/1990 Sanders, Jr. et al. ........ 400/322
5,588,757 A * 12/1996 Unosawa et al. ........... 400/322
6,034,714 A * 3/2000 Ghosh et al. ............... 347/262

FOREIGN PATENT DOCUMENTS

| DE | 2533006 | * | 2/1976 | |
| JP | 62-99175 | * | 5/1987 | ............. 101/93.04 |
| JP | 8276562 | | 10/1996 | |

* cited by examiner

Primary Examiner—Daniel J. Colilla
(74) Attorney, Agent, or Firm—Herbert L. Lerner; Laurence A. Greenberg; Werner H. Stemer

(57) ABSTRACT

A method and an apparatus are provided for absorbing lateral sideframe vibration in printing units. A member is connected between two sideframes of a printing unit. According to one embodiment, the member is a rod and a mass slides on the rod. The mass is biased between two springs and a unit frame tie surrounds the rod. According to another embodiment, collars are disposed on the rod for adjusting the preload of the springs and additional masses may be placed on the mass sliding on the rod. A further embodiment includes a unit frame tie acting as the member and a rod connected to the unit frame tie. A mass is movable on the rod.

12 Claims, 3 Drawing Sheets

METHOD AND APPARATUS FOR ABSORBING LATERAL SIDEFRAME VIBRATION IN PRINTING UNITS

BACKGROUND OF THE INVENTION

Field of the Invention

The invention relates to a method and an apparatus for absorbing lateral sideframe vibration in printing units.

Lateral vibration can cause noticeable sway in newspaper towers. If the sway becomes large enough, it can cause high stresses at connection points of printing units. Such sway can also lead to the discomfort of press operators and can introduce a lateral double into the print.

SUMMARY OF THE INVENTION

It is accordingly an object of the invention to provide a method and an apparatus for absorbing lateral sideframe vibration in printing units, which overcome the hereinaforementioned disadvantages of the heretofore-known methods and apparatuses of this general type and which damp vibrations and eliminate stresses leading to sway, so as to make the press more user friendly and improve the printed product.

With the foregoing and other objects in view there is provided, in accordance with the invention, an apparatus for absorbing lateral sideframe vibration in printing units, comprising a member connected between two sideframes of a printing unit; and a mass movably disposed on the member.

In accordance with another feature of the invention, the member is a rod connected between the sideframes, and the mass slides on the rod. Two springs each have one end connected to the mass and another end fixed relative to a respective one of the sideframes. The springs are disposed on the rod and have equal stiffness coefficients. A hollow unit frame tie is connected between the sideframes and surrounds the rod. The mass can therefore move along the rod to find the location at which vibration absorption best takes place.

In accordance with a further feature of the invention, there are provided collars each moveable on the rod between the other end of a respective one of the springs and a respective one of the sideframes. The rod is at least partly externally threaded, and the collars are internally threaded. This permits the preload in the springs to be manually adjusted. At least one additional mass is removably attached to the mass sliding on the rod. This feature also permits adjustment of the absorption apparatus. The use of collars also allows for ease of assembly by permitting parts to be installed loose and then tightened until preload is ensured. Collars allow springs to be easily changed in order to change spring rate of the system.

In accordance with an added feature of the invention, the member is a unit frame tie connected between the sideframes, and the mass is movable relative to the unit frame tie. A rod is connected to the unit frame tie and the mass is movable along the rod. The rod is externally threaded and the mass is internally threaded. The absorption apparatus can be adjusted in this way as well.

With the objects of the invention in view, there is also provided a method for absorbing lateral sideframe vibration in printing units, which comprises connecting a member between two sideframes of a printing unit; and placing a movable mass on the member.

In accordance with another mode of the invention, there is provided a method which comprises providing a rod as the member, and permitting the mass to slide on the rod. The mass is biased between two springs each having one end connected to the mass and another end fixed relative to a respective one of the sideframes. A hollow unit frame tie is disposed around the rod between the sideframes.

In accordance with a further mode of the invention, there is provided a method which comprises placing moveable collars on the rod. Each collar is disposed between the other end of a respective one of the springs and a respective one of the sideframes, for adjusting a preload of the springs. At least one additional mass may be removably attached to the mass sliding on the rod.

In accordance with a concomitant mode of the invention, there is provided a method which comprises providing a unit frame tie as the member, and moving the mass relative to the unit frame tie. A rod is connected to the unit frame tie, and the mass is moved along the rod.

Other features which are considered as characteristic for the invention are set forth in the appended claims.

Although the invention is illustrated and described herein as embodied in a method and an apparatus for absorbing lateral sideframe vibration in printing units, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
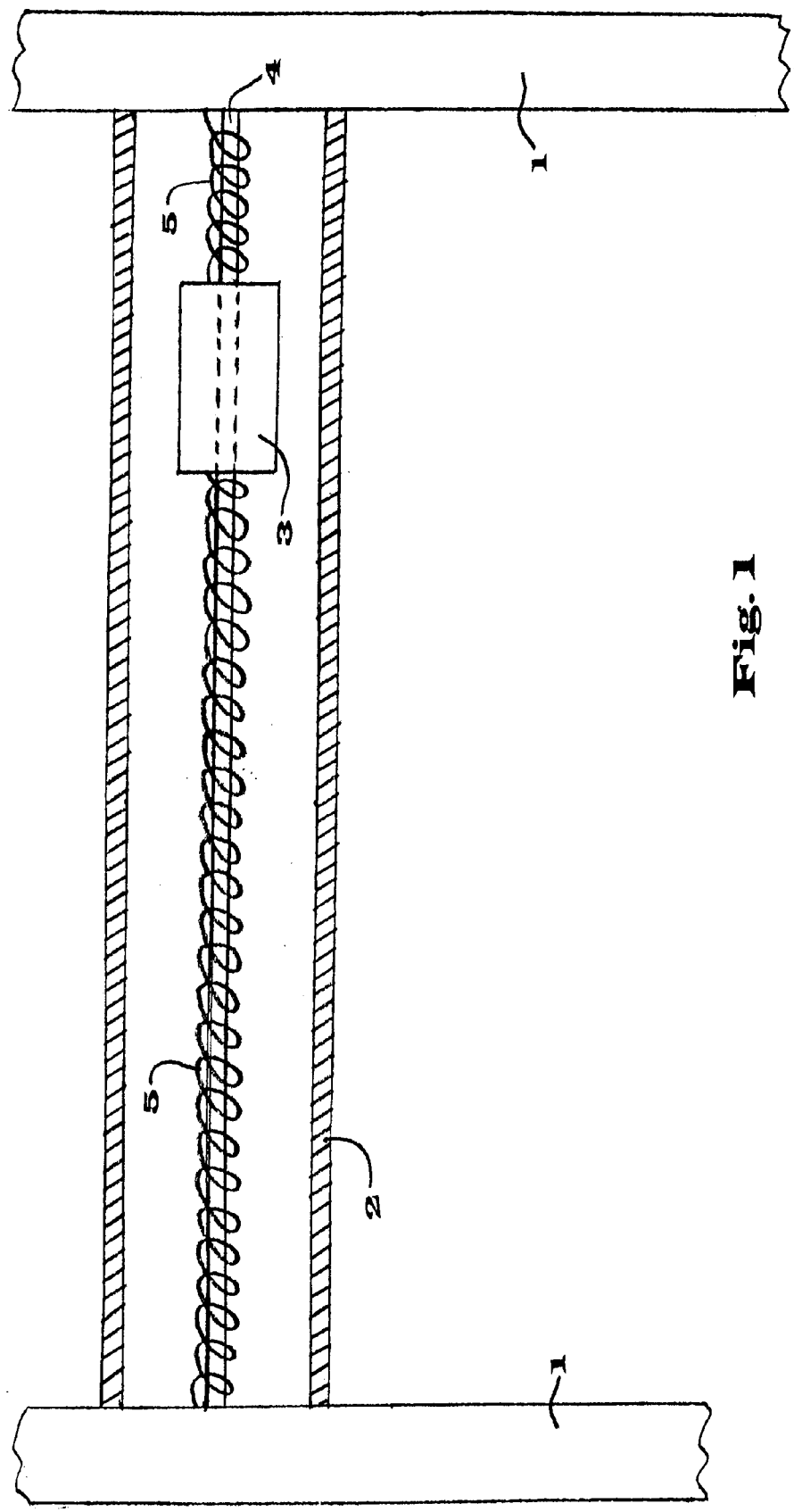
FIG. 1 is a fragmentary, diagrammatic, side-elevational view of a unit side frame of a printing press having a first embodiment of an apparatus for absorbing lateral sideframe vibration according to the invention.

Referring now in detail to the figures of the drawings, in which elements having the same or similar functions are given the same reference numerals, and first, particularly, to FIG. 1 thereof, there is seen a portion of a printing unit of a printing press having two unit sideframes 1 equipped with an absorber apparatus according to the invention. A hollow unit frame tie 2 extends between the sideframes 1 in the same direction in which lateral excitation from vibrator rolls is applied. A series of such unit frame ties 2 may be used as needed to absorb vibration, such as in the vicinity of each inking and/or dampening unit.

The unit frame tie 2 shown in the drawing has been cut open along a vertical diameter thereof to reveal its interior. It can be seen that a member in the form of a smooth rod 4 also extends between the sideframes 1 within the unit frame tie 2. A vibration isolator or mass 3 is slid over the smooth rod 4 within the unit frame tie 2 between the sideframes 1. Two springs 5 of equal stiffness are placed on the smooth rod 4, one on each side of the mass 3, for attaching the mass 3 to the sideframes 1. The mass 3 slides freely on the rod 4 to the location at which it effects vibration absorption. Each spring has a stiffness coefficient k/2, that is they each have half of a total stiffness coefficient K of the springs. The springs 5 may have equal lengths, but they may also have different lengths, as long as their stiffness coefficients are equal.

The printing unit may be considered to be a first spring-mass system which is excited by a forcing frequency. The mass 3 disposed on the smooth rod 4 between the springs 5 represents a second spring-mass system which is attached to the first and has a natural frequency that is chosen in dependence on the forcing frequency. It is known from the study of vibrations that the amplitude of a displacement of the first spring-mass system may be set to zero by the introduction of the second spring-mass system with a specific mass and stiffness coefficient or spring constant.

Figure 2:
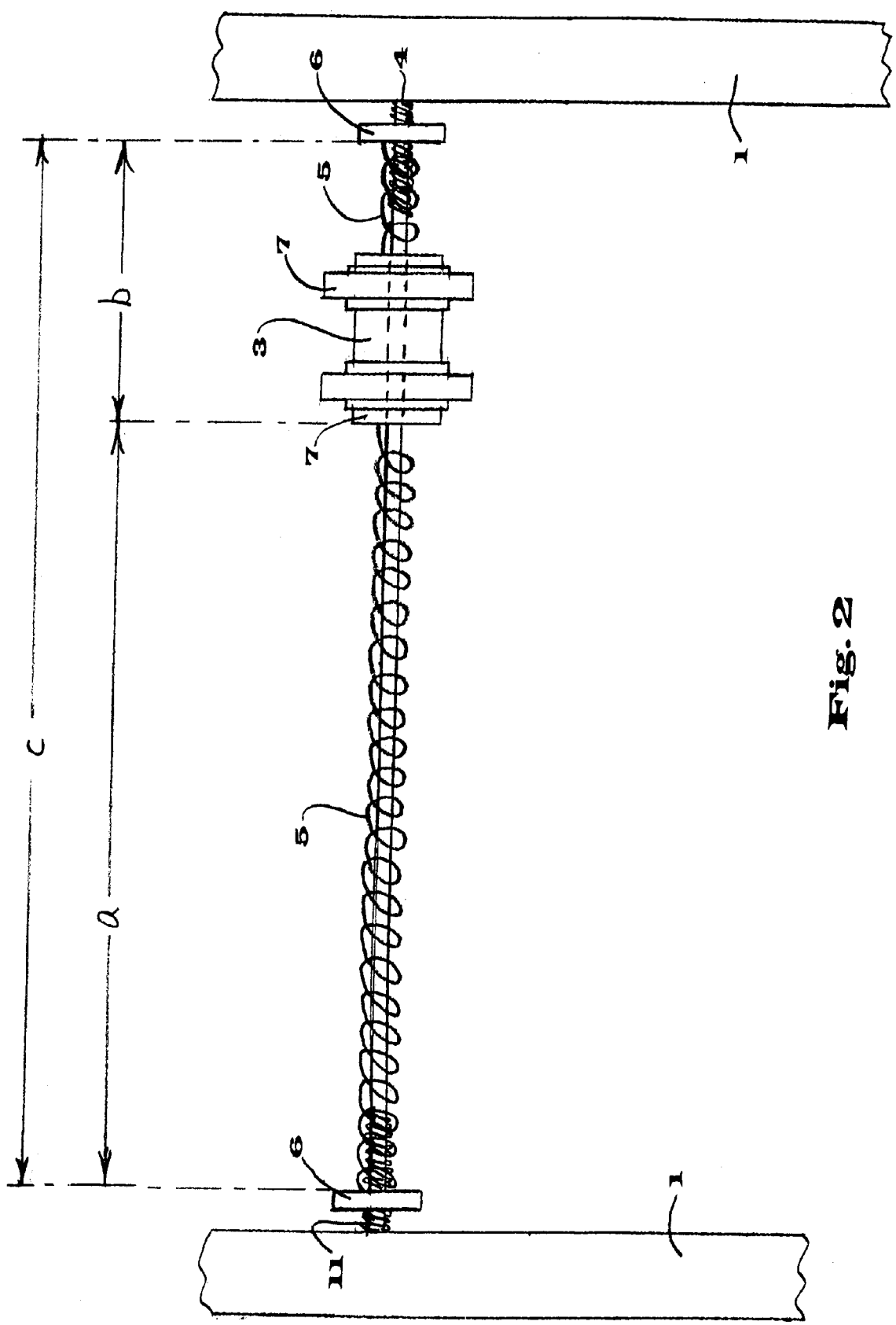
FIG. 2 is a view similar to FIG. 1 showing a second embodiment of the invention.

FIG. 2 shows a second embodiment of the invention, in which the sideframes 1, the rod 4, the mass 3 and the springs 5 are provided, in a manner similar to FIG. 1. The mass 3 again slides freely on the member or rod 4 and the springs have equal stiffness coefficients and may have equal lengths. However, in this embodiment, the rod 4 has an external thread 11, at least in end portions thereof. Internally threaded collars 6 are screwed onto the rod and additional removable masses 7 are placed on the mass 3. The threaded collars 6 and the additional removable masses 7 are used to tune the frequency of the absorber apparatus. This is done by positioning the threaded collars 6 to change the preload of the springs 5 and by adding or removing the additional removable masses 7.

The collars 6 are spaced apart by a distance c which is divided by the mass 3 into partial distances a and b. A stiffness coefficient $K_1$, of the system, which is a constant, is made up of a stiffness coefficient $K_1/2$ of one spring 5 and a stiffness coefficient $K_1/2$ of the other spring 5. Changing the distance c does not change the stiffness coefficient $K_1$. The mass m of the mass 3 is a variable and therefore the tuning frequency w of the system is variable since $$w = \sqrt{\frac{K_1}{m}}.$$

Figure 3:
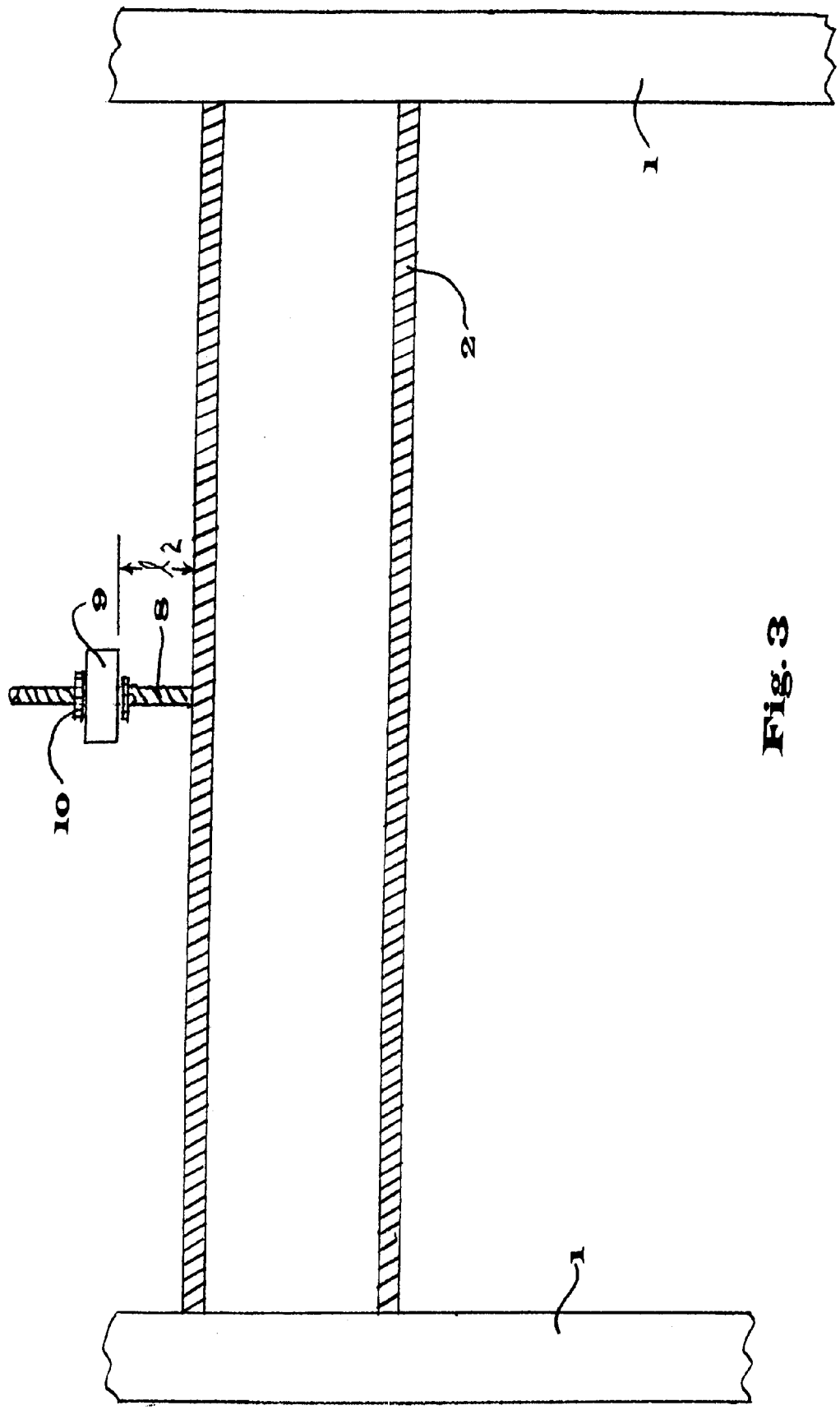
FIG. 3 is a view similar to FIGS. 1 and 2 showing a third embodiment of the invention.

A third embodiment of the absorber apparatus according to the invention is illustrated in FIG. 3. A member in the form of a hollow unit frame tie 2 is disposed between two sideframes 1. The frame tie 2 need not be hollow in the embodiment of FIG. 3. In this embodiment, a threaded rod 8 is attached to the unit frame tie 2. A mass 9 having a threaded hole is cantilevered on the rod 8 and is locked in place by a locking device 10, such as nuts or clamps, after positioning the mass 9. The tuning frequency of the absorber apparatus may be changed by changing the distance between the unit frame tie 2 and the mass 9. The mass 9 is spaced at a distance $l_2$ from the frame tie 2, the mass $m_2$ of the mass 9 is variable and changing the distance $l_2$ changes the stiffness coefficient $K_2$.

Accordingly, $$K_2 = f\left(\frac{1}{(l_2^3)}\right)$$

which is variable.

We claim:

1. An apparatus for absorbing lateral sideframe vibration in printing units, comprising:

a rod connected between two sideframes of a printing unit;

a mass for absorbing lateral sideframe vibrations of the printing unit, said mass slidingly disposed on said rod; and two springs disposed on said rod;
each one of said springs having one end connected to said mass and another end fixed relative to a respective one of the sideframes.

2. The apparatus according to claim 1, wherein said springs have equal stiffness coefficients.

3. The apparatus according to claim 1, including a hollow unit frame tie connected between the sideframes and surrounding said rod.

4. The apparatus according to claim 1, including collars each moveable on said rod between the other end of a respective one of said springs and a respective one of the sideframes, for adjusting a preload of said springs.

5. The apparatus according to claim 4, wherein said rod is at least partly externally threaded, and said collars are internally threaded.

6. The apparatus according to claim 1, including at least one additional mass removably attached to said mass sliding on said rod.

7. An apparatus for absorbing lateral sideframe vibration in printing units, comprising:

a unit frame tie connected between two sideframes of a printing unit;

a rod connected to said unit frame tie; and a mass for absorbing lateral vibration of the printing unit, said mass movably disposed along said rod relative to said unit frame tie.

8. The apparatus according to claim 7, wherein said rod is externally threaded and said mass is internally threaded.

9. A method for absorbing lateral sideframe vibration in printing units, which comprises:

connecting a rod between two sideframes of a printing unit; and placing a slideable mass on the rod to absorb lateral sideframe vibration of the printing unit;

biasing the mass between two springs each having one end connected to the mass and another end fixed relative to a respective one of the sideframes; and placing moveable collars on the rod each between the other end of a respective one of the springs and a respective one of the sideframes, for adjusting a preload of the springs.

10. The method according to claim 9, which comprises providing a hollow unit frame tie around the rod between the sideframes.

11. The method according to claim 9, which comprises removably attaching at least one additional mass to the mass sliding on the rod.

12. A method for absorbing lateral sideframe vibration in printing units, which comprises:

connecting a unit frame tie between two sideframes of a printing unit;

placing a movable mass on the unit frame tie; and connecting a rod to the unit frame tie, and moving the mass along the rod and relative to the unit frame tie.

\* \* \* \* \*